(Model.)

H. C. SHEPPARD.
EYEGLASSES.

No. 340,627. Patented Apr. 27, 1886.

WITNESSES

INVENTOR
Henry C. Sheppard M.D.

United States Patent Office.

HENRY C. SHEPPARD, OF PHILADELPHIA, PENNSYLVANIA.

EYEGLASSES.

SPECIFICATION forming part of Letters Patent No. 340,627, dated April 27, 1886.

Application filed August 15, 1885. Serial No. 174,525. (Model.)

*To all whom it may concern:*

Be it known that I, HENRY C. SHEPPARD, a citizen of the United States, residing at Philadelphia, in the county of Philadelphia and State of Pennsylvania, have invented certain new and useful Improvements in Eyeglasses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of inventions known as "eyeglasses;" and it consists in so constructing the frame that the nose is free from pressure by the spring, and the glasses are easily adjusted to the face, which will be hereinafter more clearly pointed out in the claims.

Figure 1:
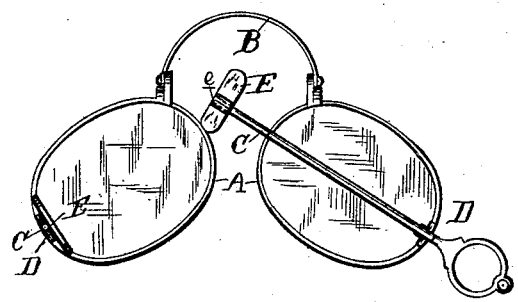
Figure 2:
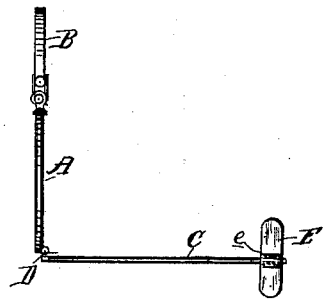

In the drawings, Figure 1 is a front view of the glasses. Fig. 2 is a side view of the same.

A A represent two lenses mounted in the usual manner, and attached together by a spring bent in the same plane with the frame. The spring B is secured in place by any ordinary means. The arms C are hinged at D, and are each provided with cross-arm, E, at their extreme ends, which are made adjustable to suit the contour of the face. When applied to the person, the nose-piece, which is formed of a spring, allows the nose to be free from being pinched, said nose-spring B remaining above the nose.

When worn and open, these glasses are held in position by the pressure on the temples of the face of the cross pieces or arms E, which are easily adjusted to the form of the face.

These glasses may be compactly folded, so as to occupy no more space than an ordinary pair of glasses.

I am aware that glasses have been constructed with bows having pads at their extreme ends for holding the same on the face of the person using them, and therefore do not claim such, broadly; but What I do claim, and desire to secure by Letters Patent, is—

1. The combination, with the lens-frames connected by a spring, B, which in use is held above and out of contact with the nose of the wearer, of the hinged arms C, having bearing-arms E, whereby the glasses are held in position by arms C only, as and for the purpose set forth.

2. In eyeglasses as described, the combination, with the lens-frames and their connecting spring, as B, of hinged arms C, having swiveled bearing-arms E, arranged and adapted to serve as set forth.

In testimony whereof I affix my signature in presence of two witnesses.

HENRY C. SHEPPARD.

Witnesses:
D. P. COWL,
WM. P. PATTON.